J. A. CLARKE.
COUNTER APPLIANCE.
APPLICATION FILED JAN. 29, 1916.
1,208,485.
Patented Dec. 12, 1916.
2 SHEETS—SHEET 1.
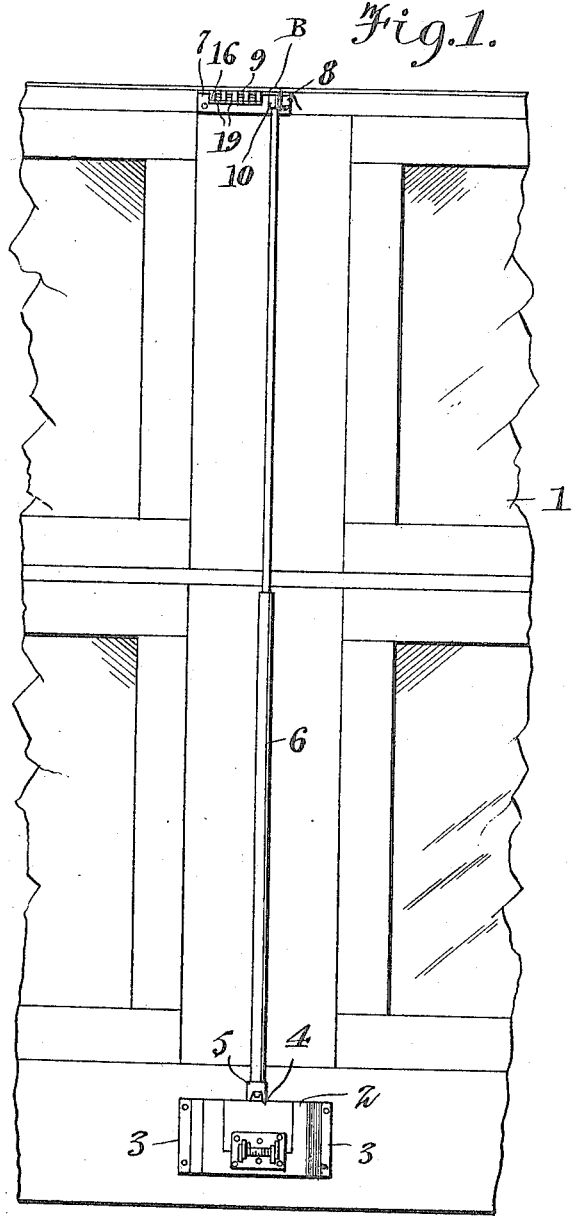
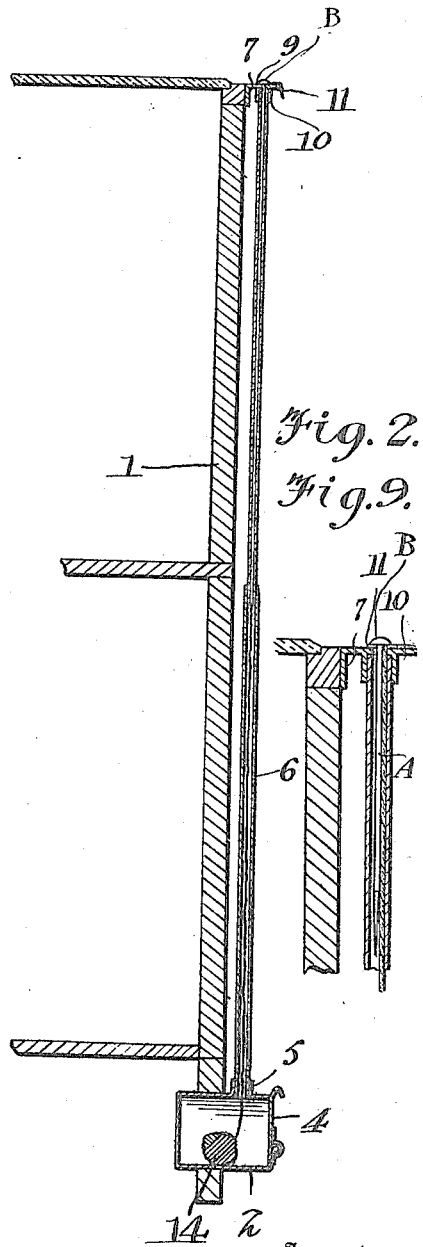
Witnesses
Frederick W. Ely
Inventor
Justin A. Clarke.
By Victor J. Evans
Attorney J. A. CLARKE.
COUNTER APPLIANCE.
APPLICATION FILED JAN. 29, 1916.
1,208,485.
Patented Dec. 12, 1916.
2 SHEETS—SHEET 2.
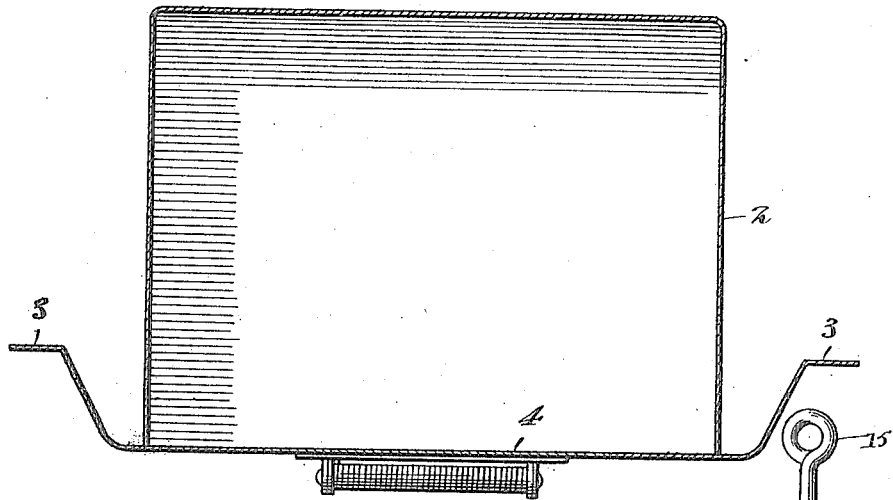
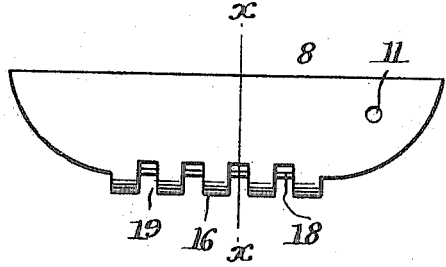
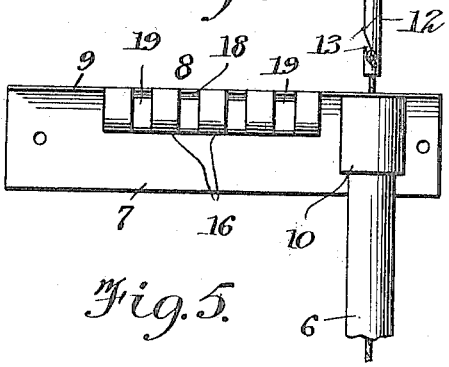
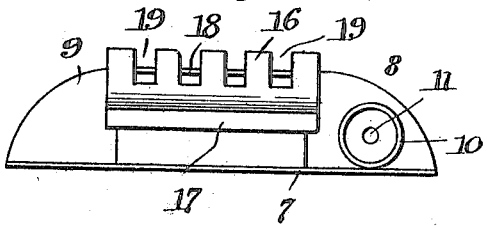
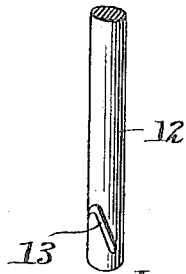
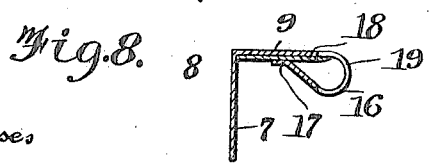
Witnesses
Frederick W. El
Inventor
Justin A. Clarke.
By Victor J. Evans
Attorney

UNITED STATES PATENT OFFICE.

JUSTIN A. CLARKE, OF VINCENNES, INDIANA.

COUNTER APPLIANCE.

1,208,485.

Specification of Letters Patent.

Patented Dec. 12, 1916.

Application filed January 29, 1916. Serial No. 75,083.

*To all whom it may concern:*

Be it known that I, JUSTIN A. CLARKE, a citizen of the United States, residing at Vincennes, in the county of Knox and State of Indiana, have invented new and useful Improvements in Counter Appliances, of which the following is a specification.

This invention relates to a counter appliance for stores or the like.

In carrying out my invention it is my purpose to provide a wrapping cord cutter that may be easily and securely attached to varying sizes of counters or the like, and whereby the cord will be at all times in a position ready to be used by the bundle wrapper or clerk and whereby the cutter member is effectively guarded so as to prevent the same inflicting injury to the operator or to persons contacting with the portion of the counter to which the device is secured.

It is also my purpose to construct a device of this character which shall include a housing forming a receptacle for a ball of twine; to provide telescopic tubular members communicating with the housing and through which the cord is fed; to arrange upon the outer tube an angular member which is secured to the counter top; to provide the said angular member with a slotted spring guard or shield which holds and protects the edge of the cutting element, and also provide a headed rod having a hooked end adapted to be passed through an opening in the horizontal portion of the angular member through the tubes to draw the cord or twine through the tubes and opening and means are provided for preventing the reëntrance of the twine to the tube and for retaining the end of the cord accessible to the operator.

A further object of the invention is to construct a device of this character which will embody the desirable features of simplicity and cheapness in manufacture.

With the above and other objects in view, the improvement resides in the construction, combination and arrangement of parts set forth in the following specification and falling within the scope of the appended claims.

In the drawings: Figure 1 is a view illustrating the application of my improvement, Fig. 2 is a central vertical sectional view through the same, Fig. 3 is a view illustrating the manner in which the cord is drawn through the telescopic tubes, Fig. 4 is a horizontal section through the cord box or receptacle, Fig. 5 is a detail perspective view of the toothed or hook member of the rod, Fig. 6 is a top plan view of the guard, upon an enlarged scale, Fig. 7 is a bottom plan view of the same, and Fig. 8 is a sectional view approximately on the line $x$—$x$ of Fig. 6. Fig. 9 is an enlarged vertical sectional view through the upper portion of the device and through the counter and showing in detail an element which may be employed for preventing the reëntrance of the end of the twine to the tube.

The numeral 1 designates an ordinary store counter, and secured upon the inner side of the counter and at the lower portion thereof is a box-like receptacle 2. The receptacle 2 has its outer face provided with extensions or flanges 3 having openings for the reception of securing elements, and the outer face is centrally provided with a spring pressed door 4. The top of the receptacle, preferably adjacent the front end thereof is provided with an opening which is surrounded by a collar 5, and arranged upon the collar is a plurality of telescopic tubes 6. The tubes are adapted to be projected the height of the counter, and secured upon the said counter, preferably at the inner edge thereof is the vertical portion 7 of a right angular member providing a cutter guard 8. The horizontal member of the guard, indicated by the numeral 9, is provided adjacent one of its ends with a depending sleeve or collar 10 which is adapted to receive the upper end of the tube 6, and the telescopic sections of the tube may be secured in an adjusted position in any desired or preferred manner. The horizontal member 9 of the guard has an opening 11 which communicates centrally with the sleeve 10, and adapted to be passed through this opening 11 as well as through the tube 6 and to enter the receptacle 2 through the collar 5 thereof is a draw rod or bodkin 12, the rod 12 having its lower end slit and provided with a hook 13, and this hook is adapted to receive the knotted end of a ball of twine 14 arranged within the receptacle, whereby one end of the twine may be drawn through the tube and over the guard 8. The opposite end of the bodkin 12 is provided with a head 15, and said bodkin is of a sufficient cross sectional diameter to be again inserted through the opening 11, tube 6 and have its lower end received within the receptacle after the end of the cord has been passed over the guard, so as to hold the said end to prevent the reëntrance of the same to the tube.

The guard is preferably constructed of metal, and the outer edge of the horizontal portion 9 thereof is, at a suitable distance from its ends, curved outwardly and inwardly, as at 16, providing a spring pressed clamp 17 which is adapted to exert a pressure against the underface of the said horizontal member of the guard and to also secure between the said clamp and said horizontal member the body portion of a cutter member 18. The curved portion 16 of the clamp 17 is provided with spaced slots 19 so that the edge of the cutter member 18 will be extended within the area of the said slots, and whereby the end of the cord after being wrapped around a suitable bundle, may be passed within the slots and into contacting engagement with the knife edge of the cutter member 18.

While the bodkin 12 is employed to draw the twine from the receptacle 2 through the tube, it may also be employed for preventing the twine from reëntering the receptacle through the tube. But in some instances I find it desirable to provide a somewhat different means to prevent the twine from reëntering the tube, and therefore, and as illustrated in Fig. 9, I provide a pin A provided with a head B which overlies the opening 11. The pin A is of sufficient weight to drop by gravity to grip the end of the twine to prevent the same entering the tube, while the said weight of the pin is not sufficient to interfere with the ready drawing of the twine through the tube. The length of the pin is sufficient to prevent the same being entirely removed from the tube when the cord is drawn therethrough.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. A cord attachment for counters including a cord receptacle, a telescopic tube communicating with the receptacle, a guard receiving the tube, said guard including a horizontal portion having its edge curved outwardly and downwardly and terminating in a clamp which exerts a pressure against the underface of the said horizontal portion, a cutting member engaged by the clamp and having its edge arranged at the rounded portion, the said rounded portion being provided with spaced slots, a bodkin for drawing the cord from the receptacle through the tube over the guard, and said bodkin adapted to serve as a retaining element for the cord.

2. A cord attachment for counters including a receptacle having a ball of cord therein, a spring door for the receptacle, a telescopic tubular member communicating with the receptacle, a right angular guard having a sleeve receiving the outer end of the tube, said guard having an opening communicating with the tube, a cutting element upon the guard, and means for drawing the end of the cord through the tube and through the opening of the guard, and said means adapted to serve as a retaining element for the cord, substantially as described.

3. A cord attachment for counters including a receptacle adapted to receive a ball of cord, a telescopic tubular member communicating with the receptacle and through which the cord is fed, an angular guard having one of its ends connecting the outer tubular member and being provided with an opening which registers with the bore of said tube and through which the cord also passes, the said angular guard including spaced curved fingers, a cutting element disposed between the fingers, and a headed gravity pin member inserted through the opening and in the tube to engage the cord to prevent the reëntrance of the end of the same to the tube.

In testimony whereof I affix my signature in presence of two witnesses.

JUSTIN A. CLARKE.

Witnesses:
LeRoy M. Wade,
J. Audrey Stilwell.